United States Patent
Edinger et al.

(10) Patent No.: US 10,434,994 B2
(45) Date of Patent: Oct. 8, 2019

(54) SYSTEM AND METHOD FOR PREVENTING UNDESIRED MOVEMENTS OF A MOTOR VEHICLE COMBINATION

(71) Applicant: Scania CV AB, Södertälje (SE)

(72) Inventors: Martin Edinger, Hägersten (SE); Sebastian Arcordh, Södertälje (SE); Mats Löfstrand, Halmstad (SE)

(73) Assignee: SCANIA CV AB (SE)

( * ) Notice: Subject to any disclaimer, the term of this patent is extended or adjusted under 35 U.S.C. 154(b) by 319 days.

(21) Appl. No.: 15/501,874

(22) PCT Filed: Aug. 10, 2015

(86) PCT No.: PCT/SE2015/050862
§ 371 (c)(1),
(2) Date: Feb. 6, 2017

(87) PCT Pub. No.: WO2016/024907
PCT Pub. Date: Feb. 18, 2016

(65) Prior Publication Data
US 2018/0134263 A1    May 17, 2018

(30) Foreign Application Priority Data
Aug. 13, 2014 (SE) ...................... 1450937

(51) Int. Cl.
*B60T 7/20* (2006.01)
*B60T 7/12* (2006.01)
(Continued)

(52) U.S. Cl.
CPC .................. *B60T 7/20* (2013.01); *B60Q 9/00* (2013.01); *B60T 7/12* (2013.01); *B60T 7/22* (2013.01);
(Continued)

(58) Field of Classification Search
CPC ... B60T 7/20; B60T 8/32; B60T 8/171; B60T 8/1708; B60T 7/22; B60T 13/662;
(Continued)

(56) References Cited

U.S. PATENT DOCUMENTS 4,804,234 A * 2/1989 Gee ........................... B60T 7/20
188/112 R
4,804,237 A * 2/1989 Gee ........................... B60T 7/20
188/3 R
(Continued)

FOREIGN PATENT DOCUMENTS

| DE | 10 2011 118 169 A1 | 5/2013 |
| GB | 2 340 902 A | 3/2000 |
| GB | 2 461 150 A | 12/2009 |

OTHER PUBLICATIONS

International Search Report dated Nov. 17, 2015 in corresponding PCT International Application No. PCT/SE2015/050862.
(Continued)

*Primary Examiner* — Muhammad Shafi
(74) *Attorney, Agent, or Firm* — Ostrolenk Faber LLP

(57) ABSTRACT

A method for preventing undesired movements of a motor vehicle combination (100) including a tractor vehicle (110) and a towed vehicle (112), where the tractor vehicle (110) has a parking brake system (280), the vehicle combination (100) has at least one electronically activable service brake system (270; 275) and is provided with movement detectors (210, 220, 230, 240, 250) and the parking brake system (280) is activated during desired standstills of the vehicle combination (100). The method includes the steps of:—continuously detecting (s320) movements of the vehicle combination (100) relative to a running surface on which the vehicle combination (100) is at the time; and—responding to detected movements of the vehicle combination by automatically activating (s330) service brake action of the elec-
(Continued)

tronically activable service brake system (270; 275). Also, a computer program product has program code (P) for implementing the method. A system for preventing undesired movements of a motor vehicle combination (100) and a motor vehicle combination (100) equipped with the system are disclosed.

9 Claims, 3 Drawing Sheets

(51) Int. Cl.
| | | |
|---|---|---|
| *B60T 13/66* | (2006.01) | |
| *B60T 7/22* | (2006.01) | |
| *B60T 8/17* | (2006.01) | |
| *B60Q 9/00* | (2006.01) | |
| *B60T 8/171* | (2006.01) | |
| *B60T 8/32* | (2006.01) | |

(52) U.S. Cl.
CPC ............ *B60T 8/171* (2013.01); *B60T 8/1708* (2013.01); *B60T 8/32* (2013.01); *B60T 13/66* (2013.01); *B60T 13/662* (2013.01); *B60T 2201/022* (2013.01)

(58) Field of Classification Search
CPC ...... B60T 7/12; B60T 13/66; B60T 2201/022; B60Q 9/00; B60W 10/18
USPC .......................................................... 701/70
See application file for complete search history.

(56) References Cited

U.S. PATENT DOCUMENTS

| | | | | |
|---|---|---|---|---|
| 4,818,035 | A * | 4/1989 | McNinch, Jr. ........ | B60T 8/1887 188/112 R |
| 4,984,852 | A * | 1/1991 | McNinch, Jr. ............ | B60T 7/20 188/112 R |
| 5,001,639 | A * | 3/1991 | Breen ....................... | B60T 7/20 303/123 |
| 6,322,161 | B1 | 11/2001 | Maslonka et al. ............. | 303/89 |
| 2006/0097569 | A1 | 5/2006 | Eberling et al. ......... | 303/122.15 |
| 2010/0292898 | A1* | 11/2010 | Stoehr ................... | B60C 23/009 701/48 |
| 2013/0085649 | A1* | 4/2013 | Matoy .................. | B60T 8/1708 701/70 |

OTHER PUBLICATIONS

Written Opinion dated Nov. 17, 2015 in corresponding PCT International Application No. PCT/SE2015/050862.

* cited by examiner

SYSTEM AND METHOD FOR PREVENTING UNDESIRED MOVEMENTS OF A MOTOR VEHICLE COMBINATION

CROSS-REFERENCE TO RELATED APPLICATIONS

The present application is a 35 U.S.C. §§ 371 national phase conversion of PCT/SE2015/050862, filed Aug. 10, 2015, which claims priority of Swedish Patent Application No. 1450937-6, filed Aug. 13, 2014, the contents of which are incorporated by reference herein. The PCT International Application was published in the English language.

TECHNICAL FIELD

The present invention relates to a method for preventing undesired movements of a motor vehicle combination. The invention relates also to a computer program product comprising program code for a computer for implementing a method according to the invention. The invention relates also to a system for preventing undesired movements of a motor vehicle combination and to a motor vehicle combination which is equipped with the system.

BACKGROUND

Vehicle combinations comprising a tractor unit with a trailer are generally equipped with both parking brakes and service brakes. In the case for example of timber carriers it is usual in certain regions, particularly when loading timber, to only activate parking brakes with which the tractor vehicle is provided, whereas the trailer onto which the timber is being loaded is not braked. The risk of wheels of the trailer being pressed down too deeply into the running surface on which it is at the time may thus be reduced, in which case no service brakes of the tractor vehicle or the trailer need be activated.

When loading a vehicle combination, e.g. a timber carrier, in situations where the running surface slopes, undesired vehicle movements may occur, potentially causing the trailer alone or the whole vehicle combination to begin to slide and/or roll in cases where too great a load is applied on the trailer. In certain cases the brake action applied will quite simply be insufficient. In other cases there may be too little friction between the vehicle's wheels and the running surface to keep the vehicle stationary. Loading the trailer when the vehicle combination is on a hill may in particular be hazardous if the running surface is more or less slippery, e.g. icy, muddy or wet. It should be noted that there are many applications in which a driver/operator will not be in a vehicle cab but will instead be operating a loading device, e.g. a crane device, or in other situations be in the immediate vicinity of said vehicle combination. In such situations said undesired vehicle movements may entail risk of injury or in the worst case direct danger to the life of said operator or other persons in the vehicle's surroundings. Undesired movements of the vehicle combination during loading/unloading might of course also result in damage to the vehicle combination or objects in its surroundings.

DE102011118169 describes a vehicle where an empty trailer is intended to be loaded on the actual tractor unit. When loading timber, a parking brake of the tractor vehicle is activated. In this situation said trailer is loaded by the tractor unit and allowed to roll rearwards away from said tractor vehicle. When the trailer has rolled a certain desired/appropriate distance it is braked for suitable positioning relative to said tractor vehicle. Timber loaded is secured to, and thus serves en route as a connection between, said trailer and said tractor vehicle.

SUMMARY OF THE INVENTION

There is thus a need for a reliable way of preventing undesired movements of a motor vehicle combination.

There is a need for an effective, reliable and user-friendly way of preventing undesired movements of a motor vehicle combination.

One object of the present invention is to propose a novel and advantageous method for preventing undesired movements of a motor vehicle combination.

Another object of the invention is to propose a novel and advantageous system for preventing undesired movements of a motor vehicle combination and a novel and advantageous computer program for controlling a motor vehicle combination in order to prevent undesired movements of the motor vehicle combination.

A further object of the invention is to propose an alternative method for preventing undesired movements of a motor vehicle combination, an alternative system for preventing undesired movements of a motor vehicle combination and an alternative computer program for preventing undesired movements of a motor vehicle combination.

A further object of the invention is to propose a method, a system and a computer program for a motor vehicle combination which allow safe loading and unloading of freight, e.g. timber, particularly where a running surface on which the motor vehicle combination is at the time not only slopes but is also relatively icy, muddy or wet.

One aspect of the present invention is a proposed method for preventing undesired movements of a motor vehicle combination comprising a tractor vehicle and a towed vehicle, where said tractor vehicle has a parking brake system and said vehicle combination has at least one electronically activable service brake system and is provided with movement detectors, which parking brake system is activated during desired standstills of said vehicle combination. The method may comprise the steps of:
  continuously detecting movements of said vehicle combination relative to a running surface on which said vehicle combination is at the time; and
  responding to detected movements of said vehicle combination by automatically activating service brake action of said electronically activable service brake system.

In such contexts said tractor vehicle and said towed vehicle may be coupled together, with the result that said undesired movements will comprise movements of both the tractor vehicle and the towed vehicle. Said undesired movements of said vehicle combination will thus affect both said tractor vehicle and said towed vehicle.

This results in a reliable method for preventing undesired movements of a motor vehicle combination. A further result is an effective, reliable and user-friendly method for preventing undesired movements of a motor vehicle combination.

A method is thus proposed for preventing undesired movements of a motor vehicle combination will reduce the risk of injuries or accidents to persons, e.g. an operator, in the surroundings of said vehicle combination. A method is thus proposed for reducing the risk of damage to, or other kinds of adverse effects on, objects or the vehicle combination due to undesired movements of the vehicle combination.

The method may comprise the step of automatically activating service brake action on said tractor vehicle only or on said towed vehicle only or on both said tractor vehicle and said towed vehicle. The advantageous result according to one aspect of the present invention is a flexible method. Applying service brake action on both said tractor vehicle and said towed vehicle makes it possible to achieve maximum service brake action for preventing continued undesired movements of said vehicle combination. In one variant, service brake action may be applied sequentially, viz. by first applying service brake action on the tractor vehicle and thereafter increasing the total service brake action by applying service brake action on the towed vehicle, or vice versa. In a further variant, service brake action may first be applied on the tractor vehicle only and thereafter be replaced by service brake action on the towed vehicle only, or vice versa. A versatile method is thus proposed for preventing undesired movements of a motor vehicle combination.

The method may comprise the step of controlling service brake action on the basis of determined speeds of said vehicle combination in motion. In one example, the higher the determined speed, the greater the service brake action which can be applied on said tractor vehicle only or said towed vehicle only or on both said tractor vehicle and the towed vehicle. The necessary service brake action can thus be controlled in an advantageous way.

The method may comprise the step of controlling the total service brake action applied by controlling the brake pressure of individual service brakes of the vehicle combination. The method may comprise the step of controlling the total service brake action applied by activating a suitable number of the vehicle combination's service brakes. In one version it is possible for a proportion of all of the vehicle combination's available service brakes to be used during the method according to the invention. It should be noted that the two foregoing features may be combined by controlling the brake pressure, and hence the service brake action, on a proportion of all of the vehicle combination's available service brakes. The result is a proposed flexible way of adapting service brake action applied to prevailing circumstances.

The method may be employed when no-one is in a driving cab of the vehicle. It may be employed when a combustion engine of the vehicle is not running.

The method may comprise the step of warning an operator of said vehicle combination if undesired movements of said vehicle combination are detected. This results in increased safety for said operator during loading or unloading of freight, e.g. timber. In such situations an operator, or other persons in the surroundings of the vehicle combination, may thus be made aware that undesired movements of the vehicle combination are occurring. Said operator may then move out of harm's way or take appropriate action to reduce the risk of harm due to said undesired movements, e.g. by being watchful when operating a hoisting crane which may be part of the vehicle combination.

One aspect of the present invention is a proposed system for preventing undesired movements of a motor vehicle combination comprising a tractor vehicle and a towed vehicle, where said tractor vehicle has a parking brake system and said vehicle combination has at least one electronically activable service brake system and is provided with movement detectors, which parking brake system is activated during desired standstills of said vehicle combination. The system may comprise:

a detector for continuously detecting movements of said vehicle combination relative to a running surface on which said vehicle combination is at the time; and
a responding device for responding to detected movements of said vehicle combination by automatically activating service brake action of said electronically activable service brake system.

The system may comprise:
a brake activating device for automatically activating service brake action on said tractor vehicle only or said towed vehicle only or on both said tractor vehicle and said towed vehicle.

The system may comprise:
a controller for controlling service brake action on the basis of determined speeds of said vehicle combination in motion.

The system may comprise:
means suited to warning an operator of said vehicle combination if undesired movements of said vehicle combination are detected.

One aspect of the present invention is a proposed motor vehicle combination provided with a system disclosed herein. The vehicle combination may be any from among truck, bus, car, timber carrier, contractor machine or forestry machine.

One aspect of the present invention is a proposed computer program for preventing undesired movements of a motor vehicle combination, which program comprises program code for causing an electronic control unit or another computer connected to the electronic control unit to perform steps according to the invention.

One aspect of the present invention is a proposed computer program for preventing undesired movements of a motor vehicle combination, which program comprises program code for causing an electronic control unit or another computer connected to the electronic control unit to perform steps according to the invention when said program code is run on said control unit or said computer.

One aspect of the present invention is a proposed computer program for preventing undesired movements of a motor vehicle combination, which program comprises program code stored on a computer-readable medium for causing an electronic control unit or another computer connected to the electronic control unit to perform steps according to the invention.

One aspect of the present invention is a proposed computer program for preventing undesired movements of a motor vehicle combination, which program comprises program code stored on a computer-readable medium for causing an electronic control unit or another computer connected to the electronic control unit to perform steps according to the invention when said program code is run on said control unit or said computer.

One aspect of the present invention is a proposed computer program product comprising a program code stored on a computer-readable medium for performing method steps according to the invention when said computer program is run on an electronic control unit or another computer connected to the electronic control unit.

One aspect of the present invention is a proposed computer program product comprising a program code stored in a non-volatile way on a computer-readable medium for performing method steps according to the invention when said computer program is run on an electronic control unit or another computer connected to the electronic control unit.

Further objects, advantages and novel features of the present invention will be indicated to one skilled in the art by the following details, as also by implementing the invention. Whereas the invention is described below, it should be noted that it is not limited to the specific details described. One skilled in the art who has access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read in conjunction with the accompanying drawings, in which the same reference notations are used for similar items in the various drawings, and in which.

DETAILED DESCRIPTION OF THE DRAWINGS

Figure 1:
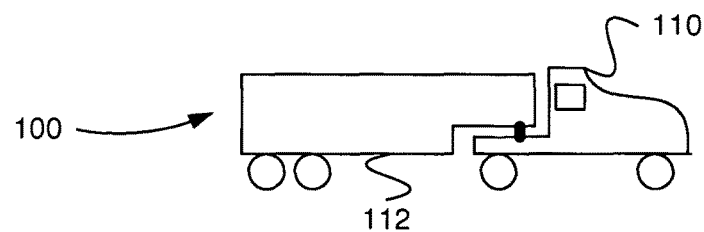
FIG. 1 illustrates schematically a motor vehicle combination according to an embodiment of the invention.

FIG. 1 depicts a sideview of a motor vehicle combination 100. The vehicle combination exemplified comprises a tractor vehicle 110 and a towed vehicle 112. The vehicle combination may be a heavy vehicle, e.g. a truck with a semitrailer coupled to it. Said towed vehicle 112 may take the form of a semitrailer, a trailer, a wagon or a so-called dolly. In one embodiment example said vehicle combination is a timber carrier comprising a tractor vehicle 110, a towed vehicle 112 and a crane device (not depicted) to make it possible to load/unload timber onto/from said towed vehicle. Said tractor vehicle and said towed vehicle are attached to one another, preferably hingedly or pivotably, enabling them to move relative to one another in a longitudinal direction of the vehicle combination 100.

The term "link" refers herein to a communication link which may be a physical line, such as an opto-electronic communication line, or a non-physical line such as a wireless connection, e.g. a radio link or microwave link.

Figure 2:
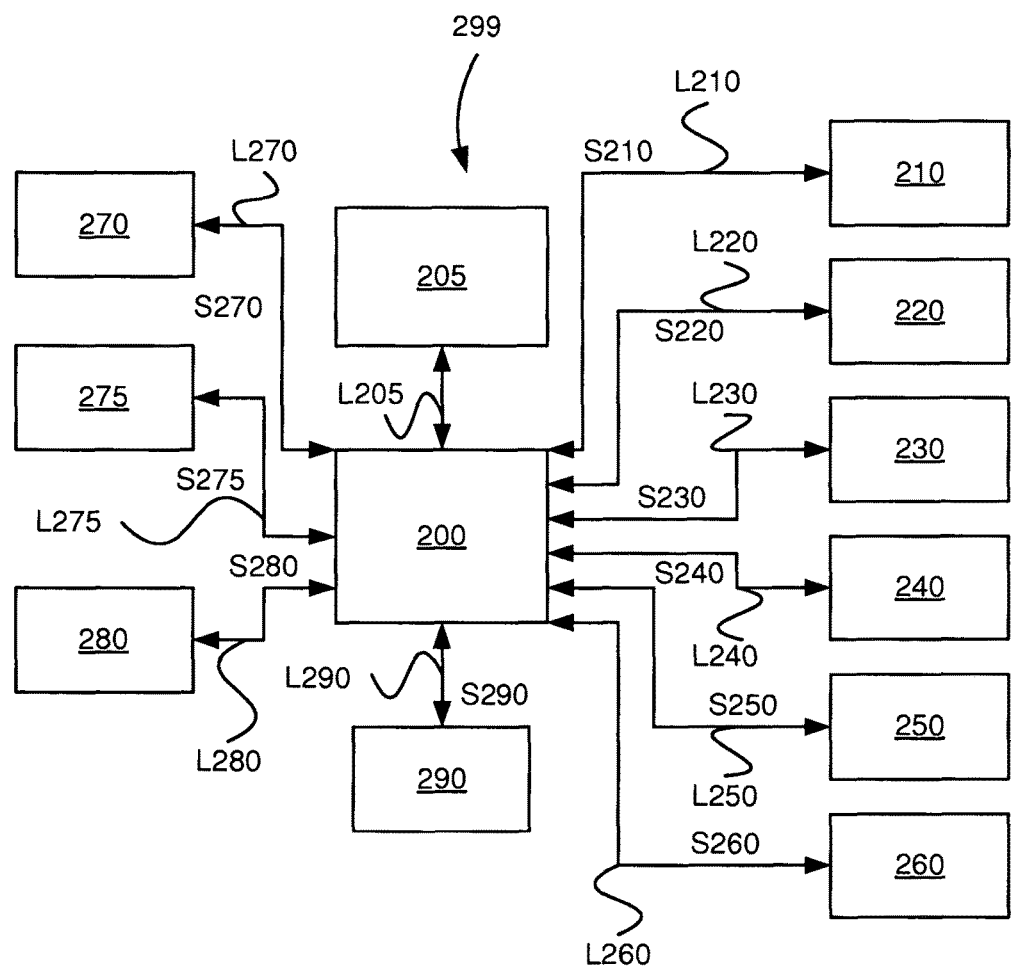
FIG. 2 illustrates schematically a system of the vehicle depicted in FIG. 1, according to an embodiment of the invention.

FIG. 2 depicts a system 299 with which the vehicle combination 100 is provided.

A first control unit 200 is arranged for communication with a first sensor configuration 210 via a first link L210. Said first sensor configuration is adapted to determining undesired movements of the vehicle combination 100. Said first sensor configuration may be adapted to determining a speed V of said vehicle combination relative to a running surface on which the vehicle combination is at the time. Said first sensor configuration is adapted to continuously sending to the first control unit 200 via said first link L210 signals S210 which convey information about undesired movements of the vehicle combination and/or information about a prevailing speed V of said vehicle combination relative to a running surface on which the vehicle combination is at the time. Said first sensor configuration 210 comprises a first set of wheel speed sensors in the form of a suitable set of sensors associated with wheels of the tractor vehicle 110.

Said first control unit 200 is arranged for communication with a second sensor configuration 220 via a second link L220. Said second sensor configuration is adapted to determining undesired movements of the vehicle combination 100. Said second sensor configuration may be adapted to determining a speed V of said vehicle combination relative to a running surface on which the vehicle combination is at the time. Said second sensor configuration is adapted to continuously sending to the first control unit 200 via said second link L220 signals S220 which convey information about undesired movements of the vehicle combination and/or information about a prevailing speed V of said vehicle combination relative to a running surface on which the vehicle combination is at the time. Said second sensor configuration 220 comprises a second set of wheel speed sensors in the form of a suitable set of sensors associated with wheels of the towed vehicle 112.

Said first control unit 200 is arranged for communication with a third sensor configuration 230 via a third link L230. Said third sensor configuration is adapted to determining undesired movements of the vehicle combination 100. Said third sensor configuration may be adapted to determining a speed V of said vehicle combination relative to a running surface on which the vehicle combination is at the time. Said third sensor configuration is adapted to continuously sending to the first control unit 200 via said third link L230 signals S230 which convey information about undesired movements of the vehicle combination and/or information about a prevailing speed V of said vehicle combination relative to a running surface on which the vehicle combination is at the time. Said third sensor configuration 230 comprises a camera device and suitable image processing programs. Said camera device may for example take the form of a video camera. Said image processing programs may alternatively be stored in a memory of the first control unit 200. Said camera device is adapted to determining undesired movements/speeds of the vehicle combination 100 relative to the running surface, e.g. by using said image processing programs to continuously determine changes to objects in the surroundings of the vehicle combination within a field of vision of the camera device.

Said first control unit 200 is arranged for communication with a fourth sensor configuration 240 via a fourth link L240. Said fourth sensor configuration is adapted to determining undesired movements of the vehicle combination 100. Said fourth sensor configuration may be adapted to determining a speed V of said vehicle combination relative to a running surface on which the vehicle combination is at the time. Said fourth sensor configuration is adapted to continuously sending to the first control unit 200 via said fourth link L240 signals S240 which convey information about undesired movements of the vehicle combination and/or information about a prevailing speed V of said vehicle combination relative to a running surface on which the vehicle combination is at the time. Said fourth sensor configuration 240 may comprise a laser unit, acoustic unit or radar unit and suitable data processing programs for assessment of distances between the vehicle combination and fixed-positioned objects in the vehicle combination's surroundings. Said data processing programs may alternatively be stored in a memory of the first control unit 200. Said devices are adapted to determining undesired movements/speeds of the vehicle combination relative to the running surface, e.g. by using said data processing programs to continuously determine distances to objects in the vehicle combination's surroundings within a field of action. The techniques adopted will be appropriate to whichever type of source said fourth sensor configuration is provided with, e.g. laser light (reflection technology), ultrasound (echo technology) or radar waves (reflection technology).

Said first control unit 200 is arranged for communication with a fifth sensor configuration 250 via a fifth link L250. Said fifth sensor configuration is adapted to determining undesired movements of the vehicle combination 100. Said fifth sensor configuration may be adapted to determining a speed V of said vehicle combination relative to a running surface on which the vehicle combination is at the time. Said fifth sensor configuration is adapted to continuously sending to the first control unit 200 via said fifth link L250 signals S250 which convey information about undesired movements of the vehicle combination and/or information about a prevailing speed V of said vehicle combination relative to a running surface on which the vehicle combination is at the time. Said fifth sensor configuration 250 comprises at least one acceleration sensor situated at a suitable location on said vehicle combination.

Presentation means 260 are arranged for communication with said first control unit 200 via a sixth link L260. Said presentation means may comprise a touchscreen or other I/O equipment. In one version an operator of the vehicle can deactivate the activation according to the invention of service brake systems of the vehicle combination 100. This involves the sending of signals S260 containing a command for said deactivation. In one embodiment example the first control unit 200 may be adapted to warning/informing said operator that the vehicle combination is being affected by undesired movements. In one version said presentation means may comprise an acoustic device for providing a strong acoustic signal to warn the surroundings if the vehicle combination is being affected by undesired movements.

A first service brake system 270 is signal-connected to the first control unit 200 via a seventh link L270. The first control unit is adapted to sending signals S270 containing commands for control of said service brake system 270 via said seventh link L270. Accordingly, the first control unit is adapted to responding, where appropriate, according to the method according to the invention, to detected undesired movements of the stationary vehicle combination 100 by automatically activating said first service brake system 270. Said first service brake system may comprise a suitable set of service brakes each adapted to applying service brake action in a controlled way to wheels of the tractor vehicle 110. Said first service brake system is controllable electronically by means of said first control unit 200. In one embodiment the first service brake system 270 is situated in the tractor vehicle 110.

A second service brake system 275 is signal-connected to the first control unit 200 via an eighth link L275. The first control unit is adapted to sending signals S275 containing commands for control of said service brake system 275 via said eighth link L275. Accordingly, the first control unit is adapted to responding, where appropriate, according to the method according to the invention, to detected undesired movements of the stationary vehicle combination 100 by automatically activating said second service brake system 275. Said second service brake system may comprise a suitable set of service brakes each adapted to applying service brake action in a controlled way to wheels of the towed vehicle 112. Said second service brake system is controllable electronically by means of said first control unit 200. In one embodiment the second service brake system 275 is situated in the towed vehicle 112.

A parking brake system 280 is signal-connected to the first control unit 200 via a ninth link L280. The first control unit is adapted to sending signals S280 which contain commands for control of said parking brake system via said ninth link L280. Accordingly, the first control unit is adapted to responding, where appropriate, by activating said parking brake system when the vehicle combination 100 is stationary for loading/unloading. Said parking brake system may comprise a suitable set of parking brakes each adapted to applying parking brake action in a controlled way to wheels of the tractor vehicle 110.

An operating means 290 is signal-connected to the first control unit 200 via a tenth link L290. The first control unit is adapted to receiving signals S290 containing commands for activation/deactivation of said parking brake system 280 via said tenth link L290. Where appropriate, the first control unit is adapted to activating said parking brake system when the vehicle combination 100 is stationary for loading/unloading. Said operating means 290 may be a lever or button or other means operable manually by an operator of the vehicle combination.

Where said parking brake system is activated during desired standstills of said vehicle combination 100, the first control unit 200 is adapted to continuously detecting movements of said vehicle combination relative to a running surface on which said vehicle combination is at the time. Where said parking brake system is activated during a desired standstill of said vehicle combination, the first control unit 200 is adapted to responding to detected movements of said vehicle combination by automatically activating service brake action of either or both of said electronically activable first service brake system 270 and second service brake system 275.

The first control unit 200 is adapted to automatically activating service brake action on said tractor vehicle 110 only or said towed vehicle 112 only or on both said tractor vehicle and said towed vehicle.

The first control unit 200 is adapted to controlling service brake action on the basis of determined speeds V of said vehicle combination 100 in motion.

The first control unit 200 is adapted to using said presentation means 260 to warn an operator of said vehicle combination 100 if undesired movements of said vehicle combination are detected.

A second control unit 205 is arranged for communication with the first control unit 200 via a link L205. The second control unit may be releasably connected to the first control unit. The second control unit may be a control unit external to the vehicle 100. The second control unit may be adapted to performing method steps according to the invention. The second control unit may be used to crossload program code to the first control unit, particularly program code for applying the method according to the invention. The second control unit may alternatively be arranged for communication with the first control unit via an internal network of the vehicle. The second control unit may be adapted to performing substantially similar functions to those of the first control unit 200.

Figure 3A:
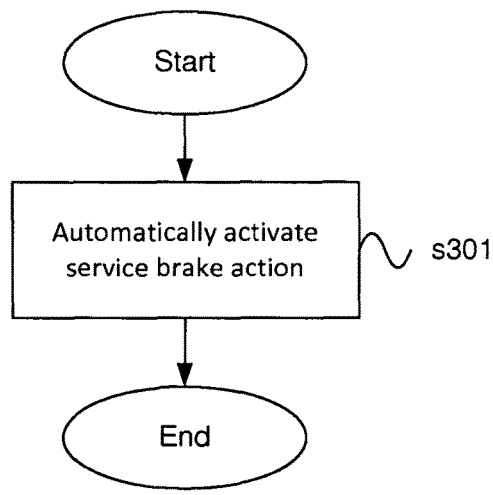
FIG. 3a illustrates schematically a flowchart of a method according to an embodiment of the invention.

FIG. 3a illustrates schematically a flowchart of a method for preventing undesired movements of a motor vehicle combination 100 comprising a tractor vehicle 110 and a towed vehicle 112, where said tractor vehicle has a parking brake system 280, said vehicle combination has at least one electronically activable service brake system 270, 275 and is provided with movement detectors 210, 220, 230, 240, 250 and said parking brake system 280 is activated during desired standstills of said vehicle combination. The method comprises a first step s301 which comprises the steps of:

continuously detecting movements of said vehicle combination relative to a running surface on which said vehicle combination is at the time;

responding to detected movements of said vehicle combination by automatically activating service brake action of said electronically activable service brake system 270, 275.

The method ends after step s301.

Figure 3B:
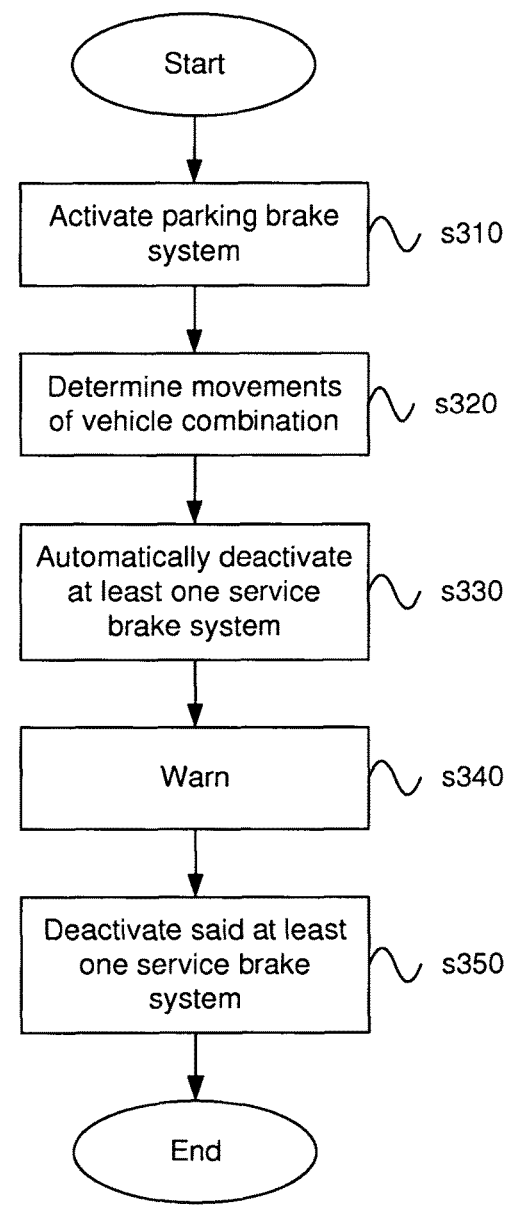
FIG. 3b illustrates schematically a more detailed flowchart of a method according to an embodiment of the invention.

FIG. 3b illustrates schematically a flowchart of a method for preventing undesired movements of a motor vehicle combination 100 comprising a tractor vehicle 110 and a towed vehicle 112, where said tractor vehicle has a parking brake system 280, said vehicle combination has at least one electronically activable service brake system 270, 275 and is provided with movement detectors 210, 220, 230, 240, 250 and said parking brake system 280 is activated during desired standstills of said vehicle combination.

The method comprises a first step s310 which may comprise the step of activating said parking brake system 280 of the vehicle combination 100. This may be effected manually via said operating means 290, enabling an operator of the vehicle combination to put the vehicle combination into a state in which loading/unloading can take place during a standstill and in which movements of the vehicle combination are undesired for safe maneuvering. Said maneuvering may involve using a crane device, e.g. to load/unload timber onto/from said towed vehicle 112. Step s310 is followed by a step s320.

Method step s320 may comprise the step of continuously detecting movements of said vehicle combination 100 relative to a running surface on which said vehicle combination is at the time. This detection may be by means of one or more of the first sensor configuration 210, the second sensor configuration 220, the third sensor configuration 230, the fourth sensor configuration 240 and the fifth sensor configuration 250. The step s320 may comprise the step of continuously determining a speed V of the vehicle combination relative to a running surface on which the vehicle combination is at the time. Said movements may comprise sliding of certain wheels, e.g. wheels or pairs of wheels equipped with said activated parking brakes. These wheels or pairs of wheels will be on the tractor vehicle 110. Said movements may comprise rolling of certain wheels, e.g. wheels or pairs of wheels not equipped with said activated parking brakes. These pairs of wheels may be on both the tractor vehicle and the towed vehicle. Step s320 is followed by a step s330.

Method step s330 may comprise the step of responding to detected movements of said vehicle combination by automatically activating service brake action of said electronically activable service brake system. Said service brake system 270 and/or service brake system 275 may thus be activated and controlled in suitable ways to prevent/stop said undesired movements of the vehicle combination.

Method step s330 may comprise the step of automatically activating service brake action on said tractor vehicle 110 only or on said towed vehicle 112 only or on both said tractor vehicle and said towed vehicle. This may be effected in suitable ways as regards sequence, number of service brakes activated and service brake action of each service brake of the vehicle combination 100.

Method step s330 may comprise the step of controlling service brake action on the basis of determined speeds V of said vehicle combination 100 in motion. Step s330 is followed by a step s340.

Method step s340 may comprise the step of warning an operator of said vehicle combination 100 if undesired movements of said vehicle combination are detected. This may be effected via said presentation equipment 260. It may comprise warning not only said operator but also other persons within a hazard area pertaining to said vehicle combination in motion. Step s340 is followed by a step s350.

Method step s350 may comprise the step of deactivating said automatically activated service brakes. This may be effected manually by an operator via said presentation means 260. Deactivation should of course not take place before the vehicle combination 100 has come to a halt after undesired movements. The method ends after step s350.

Figure 4:
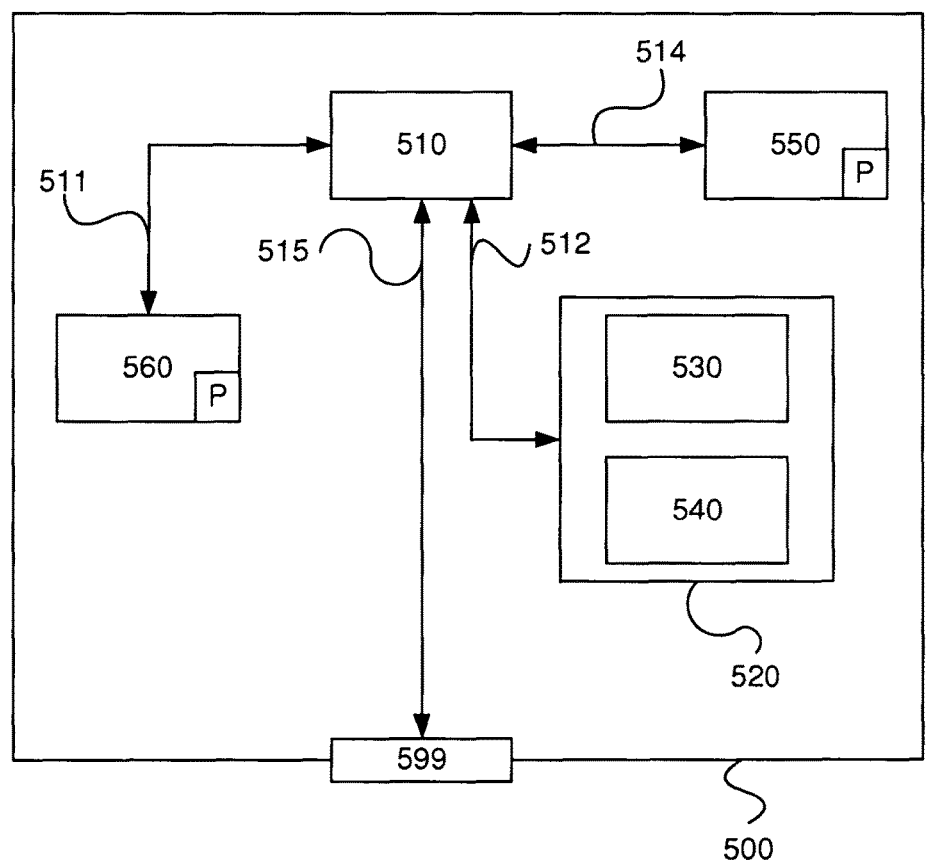
FIG. 4 illustrates schematically a computer according to an embodiment of the invention.

FIG. 4 is a diagram of one version of a device 500. The control units 200 and 205 described with reference to FIG. 2 may in one version comprise the device 500 which itself comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

A computer program P is thus proposed for preventing undesired movements of a motor vehicle combination 100 comprising a tractor vehicle 110 and a towed vehicle 112, where said tractor vehicle has a parking brake system 280, said vehicle combination has at least one electronically activable service brake system 270, 275 and is provided with movement detectors 210, 220, 230, 240, 250 and said parking brake system 280 is activated during desired standstills of said vehicle combination.

The computer program P may comprise routines for continuously detecting movements of said vehicle combination 100 relative to a running surface on which said vehicle combination is at the time. The program may comprise routines for responding to detected movements of said vehicle combination by automatically activating service brake action of said electronically activable service brake system 270, 275.

The computer program P may comprise routines for automatically activating service brake action on said tractor vehicle 110 only or on said towed vehicle 112 only or on both said tractor vehicle and said towed vehicle. The program may comprise routines for continuously determining a speed V of said vehicle combination relative to a running surface on which said vehicle combination is at the time. The program may comprise routines for controlling service brake action on the basis of determined speeds V of said vehicle combination in motion.

The computer program P may comprise routines for warning an operator of said vehicle combination 100 if undesired movements of said vehicle combination are detected.

The program P may be stored in an executable form or in compressed form in a memory 560 and/or in a read/write memory 550.

Where the data processing unit 510 is described as performing a certain function, it means that the data processing unit conducts a certain part of the program stored in the memory 560 or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is adapted to communicating with the data processing unit via a data bus 514. The links L205, L210, L220, L230, L240, L250, L250, L260, L270, L275, L280 and L290 for example may be connected to the data port (see FIG. 2).

When data are received on the data port 599, they are stored temporarily in the second memory element 540. When input data received have been temporarily stored, the data processing unit 510 will be prepared to conduct code execution as described above. In one version signals received on the data port contain information about movement speeds V of said vehicle combination 100 relative to a running surface on which the vehicle combination is at the time.

Parts of the methods herein described may be conducted by the device 500 by means of the data processing unit 510 which runs the program stored in the memory 560 or the read/write memory 550. When the device 500 runs the program, methods herein described are executed.

The foregoing description of the preferred embodiments of the present invention has been provided to illustrate and describe the invention. It is not intended to be exhaustive, nor to restrict the invention to the variants described. Many modifications and variations will obviously suggest themselves to one skilled in the art. The embodiments were chosen and described in order best to explain the principles of the invention and their practical applications and thereby make it possible for one skilled in the art to understand the invention for different embodiments and with the various modifications appropriate to the intended use.

The invention claimed is:

1. A method for preventing undesired movements of a motor vehicle combination, wherein said motor vehicle combination comprises a tractor vehicle and a towed vehicle, said tractor vehicle has a parking brake system, said motor vehicle combination has at least one electronically activable service brake system and is provided with movement detectors, said movement detectors including at least one of: (1) sensors to determine changes to objects in the surroundings of said motor vehicle combination, and (2) sensors to determine distances to objects in the surroundings of said motor vehicle combination, and said parking brake system is activated during desired standstills of said motor vehicle combination, the method comprising:
continuously detecting movements of said motor vehicle combination relative to a running surface on which said motor vehicle combination is during one of said desired standstills of said motor vehicle combination, said movements of said motor vehicle combination being due to at least one of: (1) a weight of said motor vehicle combination and a load placed on said motor vehicle combination; (2) a slope of said running surface; and (3) a surface condition of said running surface; and
responding to detected movements of said motor vehicle combination by automatically activating service brake action of said electronically activable service brake system,
wherein the step of automatically activating said service brake action is performed on said tractor vehicle only or on said towed vehicle only or on both said tractor vehicle and said towed vehicle.

2. The method according to claim 1, further comprising the step of:
controlling said service brake action on the basis of determined speeds of said motor vehicle combination in motion.

3. The method according to claim 1, further comprising the step of:
warning an operator of said motor vehicle combination if undesired movements of said motor vehicle combination are detected.

4. A system for preventing undesired movements of a motor vehicle combination, wherein said motor vehicle combination comprises a tractor vehicle and a towed vehicle, wherein said tractor vehicle has a parking brake system, said motor vehicle combination has at least one electronically activable service brake system and is provided with movement detectors, said movement detectors including at least one of: (1) sensors to determine changes to objects in the surroundings of said motor vehicle combination, and (2) sensors to determine distances to objects in the surroundings of said motor vehicle combination, and said parking brake system is activated during desired standstills of said motor vehicle combination, said system comprising:
a detecting device configured for continuously detecting movements of said motor vehicle combination relative to a running surface on which said motor vehicle combination is during one of said desired standstills of said motor vehicle combination, said movements of said motor vehicle combination being due to at least one of: (1) a weight of said motor vehicle combination and a load placed on said motor vehicle combination; (2) a slope of said running surface; and (3) a surface condition of said running surface; and
a device configured for responding to detected movements of said motor vehicle combination by automatically activating a service brake action of said electronically activable service brake system,
wherein said device configured for automatically activating said service brake action automatically activates said service brake action on said tractor vehicle only or said towed vehicle only or on both said tractor vehicle and said towed vehicle.

5. The system according to claim 4, further comprising:
a device for controlling service brake action on a basis of determined speeds of said motor vehicle combination in motion.

6. The system according to claim 4, further comprising:
a warning device configured for warning an operator of said motor vehicle combination if undesired movements of said motor vehicle combination are detected.

7. A motor vehicle combination provided with a system for preventing undesired movements of a motor vehicle combination, wherein said motor vehicle combination comprises a tractor vehicle and a towed vehicle, wherein said tractor vehicle has a parking brake system, said motor vehicle combination has at least one electronically activable service brake system and is provided with movement detectors, said movement detectors including at least one of: (1) sensors to determine changes to objects in the surroundings of said motor vehicle combination, and (2) sensors to determine distances to objects in the surroundings of said motor vehicle combination, and said parking brake system is activated during desired standstills of said motor vehicle combination, said system comprising:
a detecting device configured for continuously detecting movements of said motor vehicle combination relative to a running surface on which said motor vehicle combination is during one of said desired standstills of said motor vehicle combination, said movements of said motor vehicle combination being due to at least one of: (1) a weight of said motor vehicle combination and a load placed on said motor vehicle combination; (2) a slope of said running surface; and (3) a surface condition of said running surface; and a device configured for responding to detected movements of said motor vehicle combination by automatically activating a service brake action of said electronically activable service brake system, wherein said device configured for automatically activating said service brake action automatically activates said service brake action on said tractor vehicle only or said towed vehicle only or on both said tractor vehicle and said towed vehicle.

8. The motor vehicle combination according to claim 7, wherein the motor vehicle combination comprises at least one of a truck, a bus, a car, a timber carrier, a contractor machine forestry machine, a semitrailer, a trailer, a wagon, and a dolly.

9. A computer program product comprising a computer program for preventing undesired movements of a vehicle combination, said computer program comprising a program code stored on a non-volatile computer-readable medium for causing an electronic control unit or another computer connected to the electronic control unit to perform a method for preventing undesired movements of a motor vehicle combination, wherein said motor vehicle combination comprises a tractor vehicle and a towed vehicle, said tractor vehicle has a parking brake system, said motor vehicle combination has at least one electronically activable service brake system and is provided with movement detectors, said movement detectors including at least one of: (1) sensors to determine changes to objects in the surroundings of said motor vehicle combination, and (2) sensors to determine distances to objects in the surroundings of said motor vehicle combination, and said parking brake system is activated during desired standstills of said motor vehicle combination, the method comprising:

continuously detecting movements of said motor vehicle combination relative to a running surface on which said motor vehicle combination is during one of said desired standstills of said motor vehicle combination, said movements of said motor vehicle combination being due to at least one of: (1) a weight of said motor vehicle combination and a load placed on said motor vehicle combination; (2) a slope of said running surface; and (3) a surface condition of said running surface; and responding to detected movements of said motor vehicle combination by automatically activating service brake action of said electronically activable service brake system, wherein the step of automatically activating said service brake action is performed on said tractor vehicle only or on said towed vehicle only or on both said tractor vehicle and said towed vehicle, and wherein the method is performed when said program code is run on an electronic control unit or another computer connected to said electronic control unit.

* * * * *